United States Patent
Boccadoro et al.

(10) Patent No.: US 9,844,825 B2
(45) Date of Patent: Dec. 19, 2017

(54) METHOD AND APPARATUS FOR SPARK-EROSION MACHINING OF A WORKPIECE

(71) Applicant: Agie Charmilles SA, Losone (CH)

(72) Inventors: Marco Boccadoro, Verscio (CH); Stefano Bonini, Brissago (CH)

(73) Assignee: Agie Charmilles SA (CH)

( * ) Notice: Subject to any disclaimer, the term of this patent is extended or adjusted under 35 U.S.C. 154(b) by 451 days.

(21) Appl. No.: 14/483,566

(22) Filed: Sep. 11, 2014

(65) Prior Publication Data

US 2015/0069023 A1    Mar. 12, 2015

(30) Foreign Application Priority Data

Sep. 12, 2013    (EP) .................... 13004459

(51) Int. Cl.
  *B23H 7/04*    (2006.01)
  *B23H 7/16*    (2006.01)
  *B23H 7/18*    (2006.01)
  *B23H 1/02*    (2006.01)
  *B23H 9/14*    (2006.01)
  *B23H 7/20*    (2006.01)

(52) U.S. Cl.
  CPC ............. *B23H 1/022* (2013.01); *B23H 1/024* (2013.01); *B23H 7/20* (2013.01); *B23H 9/14* (2013.01); *B23H 7/04* (2013.01); *B23H 7/16* (2013.01)

(58) Field of Classification Search
  CPC .......... B23H 1/022; B23H 1/024; B23H 7/20; B23H 7/16; B23H 7/18; B23H 7/04
  USPC ................ 219/69.13, 69.17, 69.18
  See application file for complete search history.

(56) References Cited

U.S. PATENT DOCUMENTS

| | | | | |
|---|---|---|---|---|
| 3,758,739 A | * | 9/1973 | De Jongh | ............... B23H 7/18 219/69.16 |
| 3,987,269 A | * | 10/1976 | Inoue | .................... B23H 1/024 219/69.13 |
| 4,238,660 A | * | 12/1980 | Bell, Jr. | ................ B23H 1/028 219/69.13 |

(Continued)

FOREIGN PATENT DOCUMENTS

EP    2610027 A1    7/2013

OTHER PUBLICATIONS

Yan et al., "Monitoring and control of the micro wire-EDM process", International Journal of Machine Tools & Manufacture, vol. 47, pp. 148-157 (2007).

(Continued)

*Primary Examiner* — Arthur O Hall
*Assistant Examiner* — Joseph A Greenlund
(74) *Attorney, Agent, or Firm* — Harness, Dickey & Pierce, P.L.C.

(57) ABSTRACT

The invention relates to a method for electrical discharge machining of workpieces by electrical discharge pulses generated by a power module of an electrical discharge machine. The invention is characterized in that firstly the discharge voltage of a number N1 of electrical discharge pulses is acquired and stored, secondly a front discharge voltage (63) is determined out of this amount of N1 acquired discharge voltages and thirdly, the voltage Uhps (64) of the electrical discharge pulses produced by the power module for machining the workpiece (17) is adjusted in function of the determined front discharge voltage (63).

9 Claims, 11 Drawing Sheets

Power module

Ignition module

(56) References Cited

U.S. PATENT DOCUMENTS

| | | | | |
|---|---|---|---|---|
| 4,673,791 | A * | 6/1987 | Konno | B23H 1/022 219/69.13 |
| 5,280,153 | A * | 1/1994 | Buhler | B23H 1/022 219/69.18 |
| 5,585,014 | A * | 12/1996 | Magara | B23H 1/022 219/69.13 |
| 6,084,194 | A * | 7/2000 | Baker | B23H 9/04 204/164 |
| 6,278,075 | B1 * | 8/2001 | Kamiguchi | B23H 7/04 219/69.12 |
| 6,348,675 | B1 * | 2/2002 | Takagi | B26F 1/28 219/384 |
| 6,392,183 | B1 * | 5/2002 | Martin | B23H 1/022 219/69.13 |
| 6,713,706 | B2 * | 3/2004 | Akiyoshi | B23H 7/16 219/69.16 |
| 6,933,457 | B2 * | 8/2005 | Boccadoro | B23H 1/022 219/69.13 |
| 6,958,460 | B2 * | 10/2005 | Martin | B23H 1/022 219/69.13 |
| 7,045,735 | B2 * | 5/2006 | Satou | B23H 7/04 219/69.13 |
| 7,582,842 | B2 * | 9/2009 | D'Amario | B23H 1/022 219/69.13 |
| 8,093,528 | B2 * | 1/2012 | Boccadoro | B23H 1/022 219/69.13 |
| 8,138,442 | B2 * | 3/2012 | Sato | B23H 9/00 219/69.12 |
| 8,369,980 | B2 * | 2/2013 | Buhler | B23H 7/02 219/69.11 |
| 8,648,275 | B2 * | 2/2014 | Yamada | B23H 1/022 219/69.13 |
| 9,205,504 | B2 * | 12/2015 | Chen | B23H 1/022 |
| 2003/0173337 | A1 * | 9/2003 | Ito | B23H 9/14 219/69.14 |
| 2012/0217225 | A1 * | 8/2012 | Rudgley | B23H 1/02 219/69.16 |

OTHER PUBLICATIONS

Weck et al., "Effektivere Endstufen für die Funkenerosion Steigerung der Leistungsfähigkeit durch moderne Bauelemente", VDI-Zeitschrift vol. 129, No. 10, pp. 69-71 (Oct. 1987).
European Search Report dated Feb. 20, 2014, for related European Patent Application No. 13004459.7.

* cited by examiner

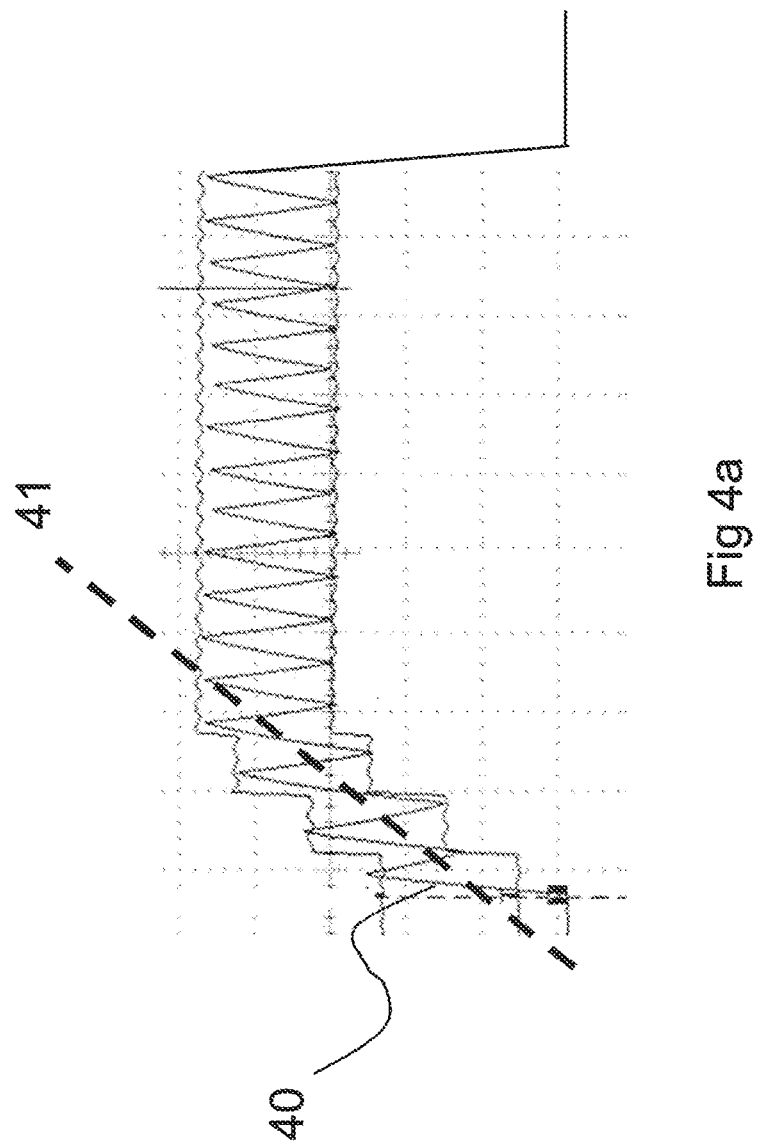

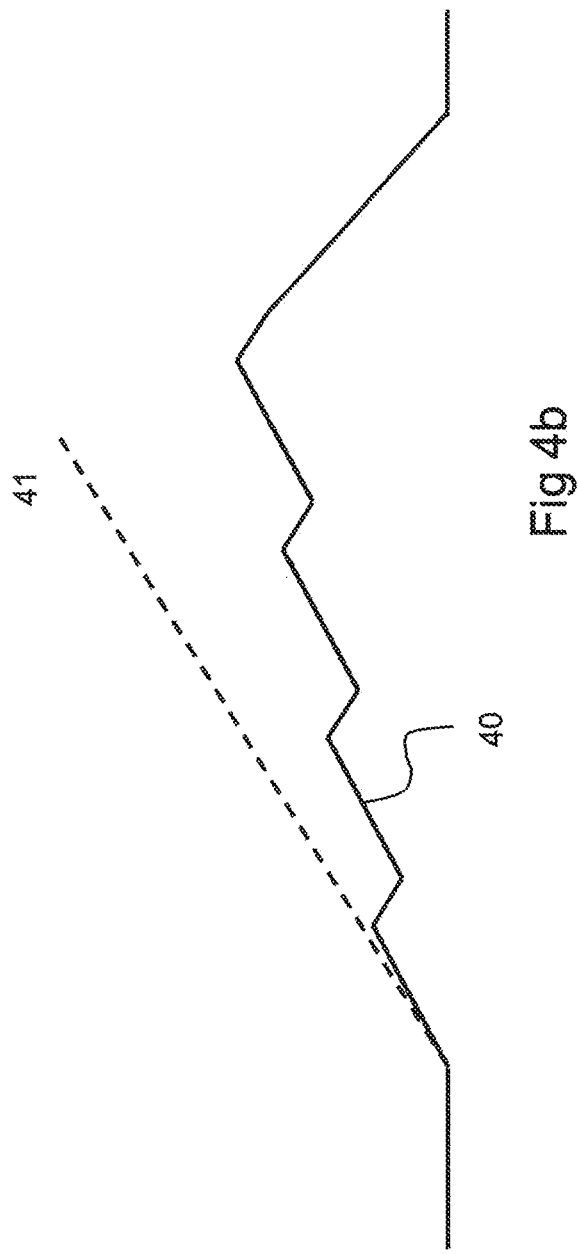

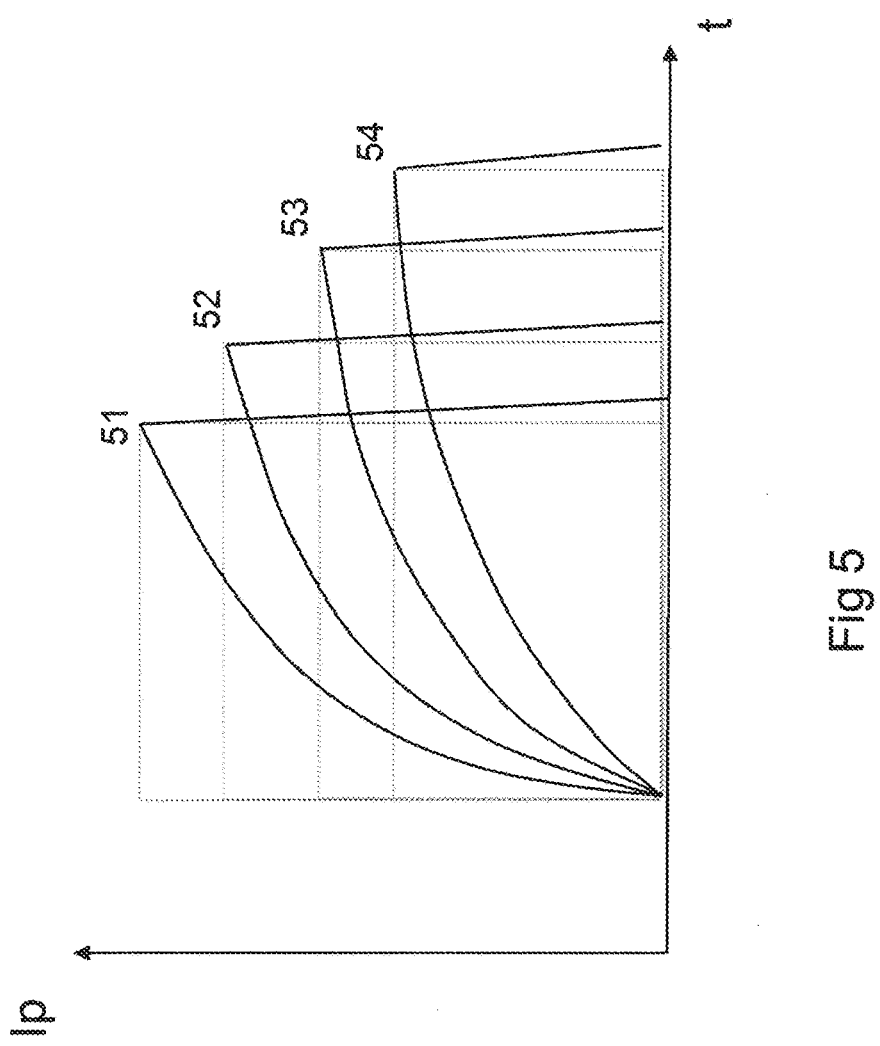

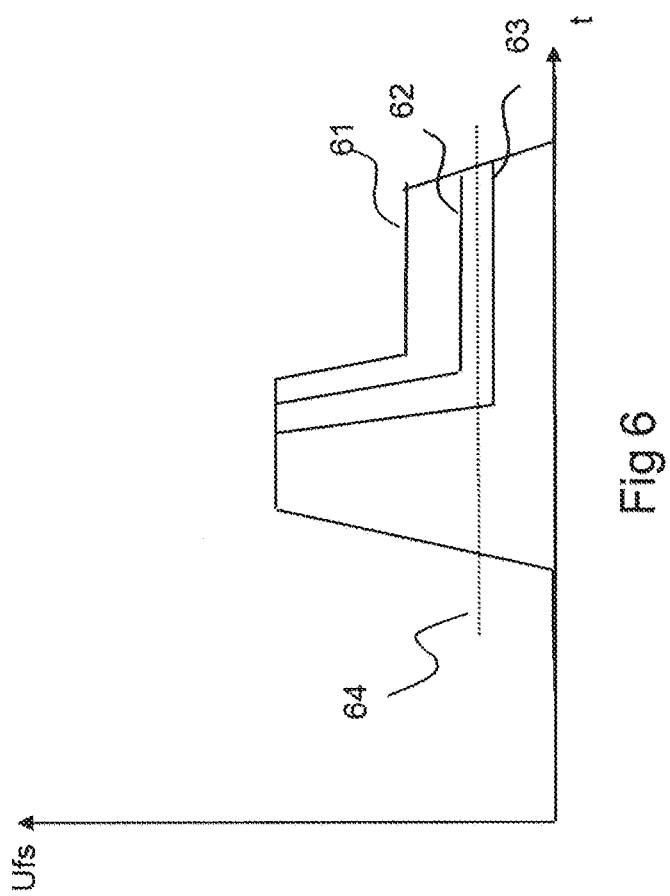

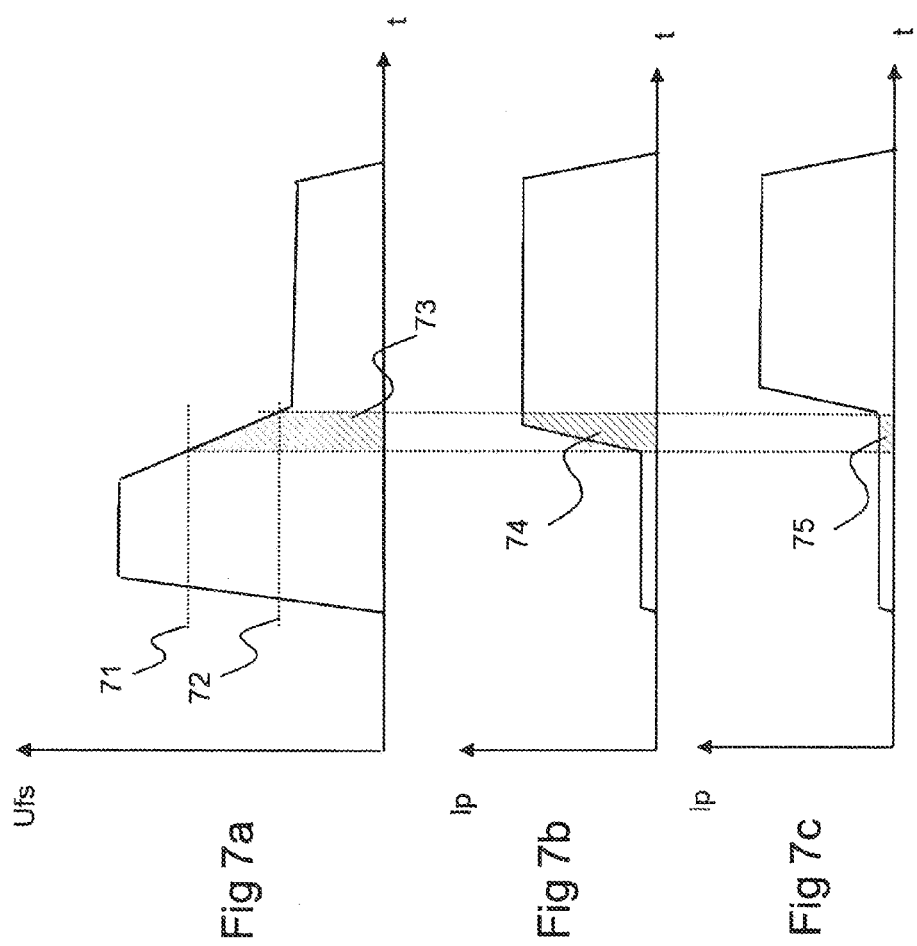

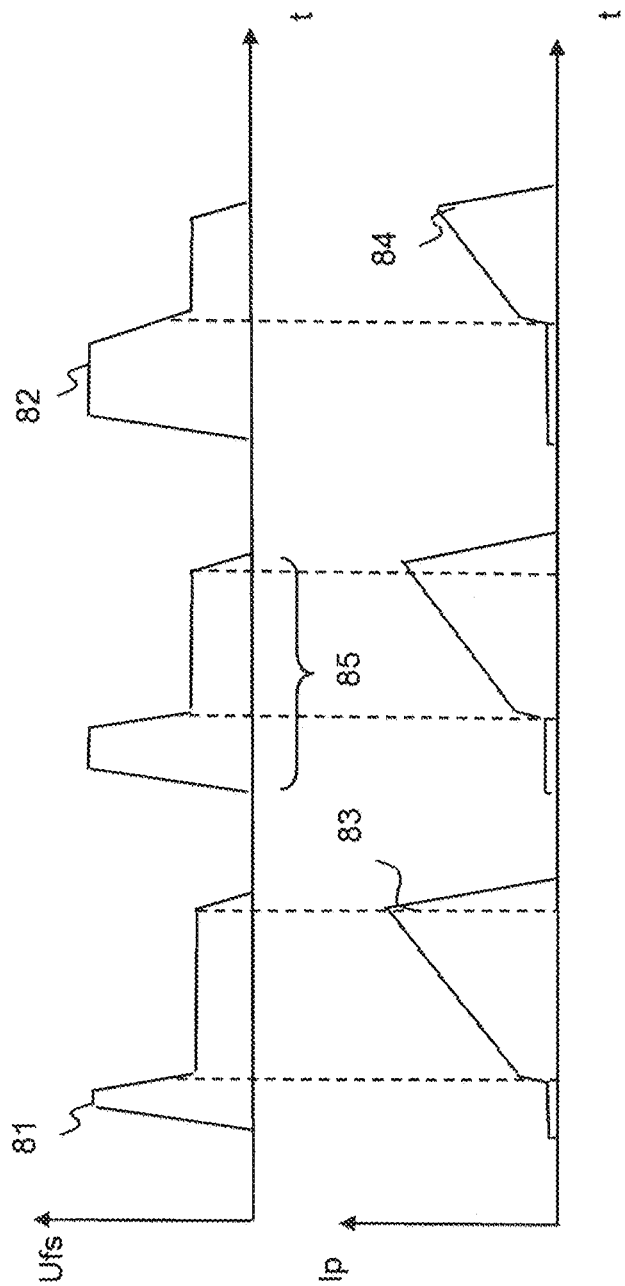

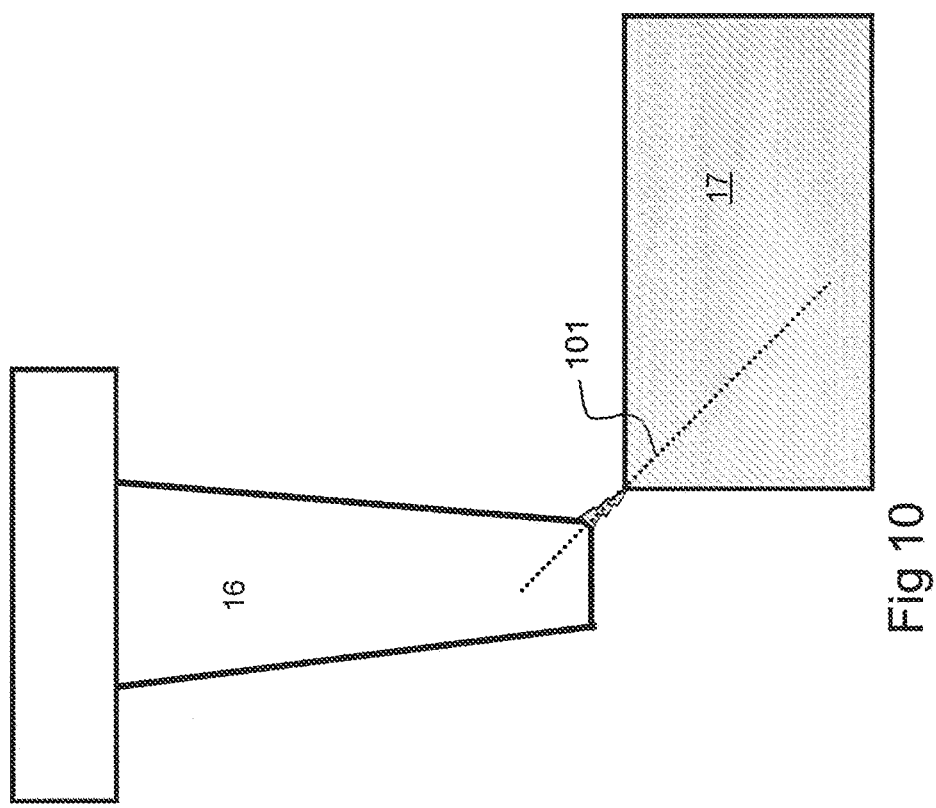

METHOD AND APPARATUS FOR SPARK-EROSION MACHINING OF A WORKPIECE

CROSS-REFERENCE TO RELATED APPLICATIONS

This application claims the benefit and priority of European Patent Application No. 13004459.7, filed on Sep. 12, 2013. The entire disclosure of the above application in incorporated herein by reference.

BACKGROUND

This section provides background information related to the present disclosure which is not necessarily prior art.

TECHNICAL FIELD

The invention relates to a method and an apparatus for increasing the productivity and accuracy of spark-erosion machining of workpieces according to the generic part of the independent claims. The invention relates in particular to an apparatus for spark-erosion electrical discharge machining (EDM) and drilling EDM of a workpiece, and to a method for controlling spark-erosion electrical discharge and drilling EDM machining of a workpiece.

Discussion

The process of electric discharge allows reproducing a shape in a workpiece by copying the geometry of a negative electrode. This copy is not exact. On the one hand, the electrode wears out during the machining; on the other hand a gap is formed between the tool electrode and the workpiece electrode. A minimum side gap is essential, since the eroded particles must be evacuated from the erosion front to the workpiece surface.

However said gap has to be kept as small as possible, for several reasons:

- As already mentioned, the copying accuracy is reduced
- In most machining operations the evacuation of the eroded particles is done by lift-off movements of the machine head, and a larger side gap weakens this pumping effect.
- The side gap is enlarged by lateral discharges which occur mainly on already eroded particles. Therefore this energy is wasted for most machining applications, especially for rib machining
- For rib machining, the thickness of the rib electrode is defined by the desired slot width minus the total inter electrode gap. The larger the gap, the thinner the electrode, and the higher is the vibration tendency of the latter, causing a loss of precision, a deterioration of the surface quality and the processing speed. This holds true as well for other EDM operation with high aspect ratio electrodes, such as EDM drilling.
- For the micro EDM machining, the dimensions of the electrode are the limiting factor. A smaller side gap allows achieving smaller structures in the workpiece.

To minimize the side gap, one tries to work with a lower open circuit voltage and low current pulses. In a standard EDM machining, the side gap is in fact proportional to the open circuit voltage and the pulse energy.

However, a reduced open circuit voltage also reduces the front gap. Since the front gap is always smaller than the side gap, its value becomes so small that the servo system which controls the distance between the two electrodes cannot perform its function satisfactorily.

The pulse energy is given by the product: (discharge voltage)*(pulse current)*(pulse duration). A small pulse energy slows down the machining, compromising the machine productivity.

It is known from the state of the art to change the power supply voltage of the generator, e.g. in EP1063043 A1 this voltage is changed in order to set precisely the current slope of the discharge pulses, as a function of the ignition delay. This method might reduce the electrode wear, but does not eliminate the side sparks nor reduce the side gap therefore is out of scope.

In US2012/0152907A1, one tries to overcome the drawbacks of the voltage source type generators, i.e. generators that use resistors to limit the current. This kind of generator produces pulses whose current varies as a function of the discharge voltage. To guarantee reproducible results, a constant (or controlled) pulse current is desirable, therefore the mentioned invention keeps the pulse current constant by adjusting the power supply voltage of the generator. Neither this method eliminates the side sparks nor it reduces the side gap, therefore is also out of scope.

The document EP2610027 A1 discloses a further electrical discharge machining method and apparatus. The teaching in that document does however not act on the power supply voltage.

Since the aforementioned methods achieve only modest results, there is a need to provide a solution to this problem.

SUMMARY OF THE INVENTION

An aspect of the present invention is to provide an improved apparatus and an improved method for electrical discharge machining of a workpiece, by preventing the occurrence of side sparks, obtaining for each processing condition the smallest possible side gap, while maintaining a higher processing speed.

The inventive solution is based on the consideration that the side pulses have a higher operating voltage and a longer ignition delay than the front pulses.

The main idea of the invention consists in acquiring and storing in real time the electrical discharge voltage of a discharge pulse and to analyze its discharge voltage for determining the pulse type and to adjust the generator power supply accordingly.

The preferred embodiment of inventive method acquires and stores a significant number of discharge pulses over a certain time duration, analyzes the measured voltages of the produced discharge pulses to determine therewith the voltage of the front and the voltage of the side discharge pulses and to automatically adjust subsequently the voltage of the pulses produced by the power module to be only slightly higher than the front discharge voltage. This procedure is repeated preferably during the entire electrical discharge machining process (e.g. consistently or in given intervals).

BRIEF DESCRIPTION OF THE DRAWINGS

The inventive method and some embodiments of the invention will now be described, by way of examples, with reference to the accompanying drawings, in which:

FIGS. 4a and 4b are graphs showing a shaped current pulse of the EDM generator;

FIG. 5 is a graph showing a set of current pulses having the same energy;

FIG. 6 is a graph showing three discharge voltage pulses

FIGS. 7a to 7c are graphs showing a discharge voltage pulse, a current pulse according to prior art and a current pulse according to the invention;

FIG. 8 is a graph showing discharge voltage pulses, and the corresponding discharge current pulses;

FIG. 10 is a representation of electrode and workpiece opposed such as to cause corner sparks.

DETAILED DESCRIPTION OF THE PREFERRED EMBODIMENTS

Example embodiments will now be described more fully with reference to the accompanying drawings.

Figure 1:
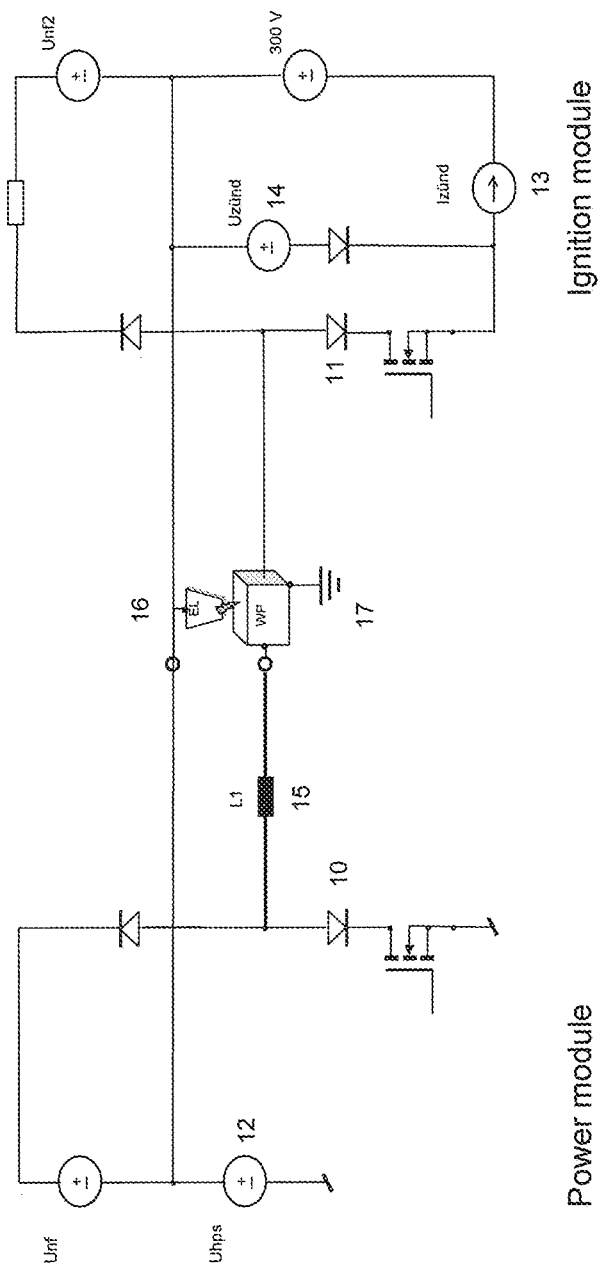
FIG. 1 is an exemplary embodiment respectively electric circuit model of the invention using an EDM generator which can be used in an electrical discharge machine.

FIG. 1 illustrates a generator composed by an ignition module and a power module as known in the state of the art.

The ignition module provides the open circuit voltage to trigger the discharge, typically 200 to 300 V. Its current is relatively small, preferably 2 A max.

The power module provides the higher pulse currents, from 2 to 60 A typically. Such a generator, that operates as a programmable current source, is explained in detail e.g. in the document DE 41 07 910 and will not be described further.

Relevant for the disclosed invention is that, because of the power module blocking diode 10, a current can flow out of the power module only if the discharge voltage is lower than the power supply voltage Uhps by the programmable power supply 12. If the discharge voltage is higher, only the small ignition module current flows.

Figure 2:
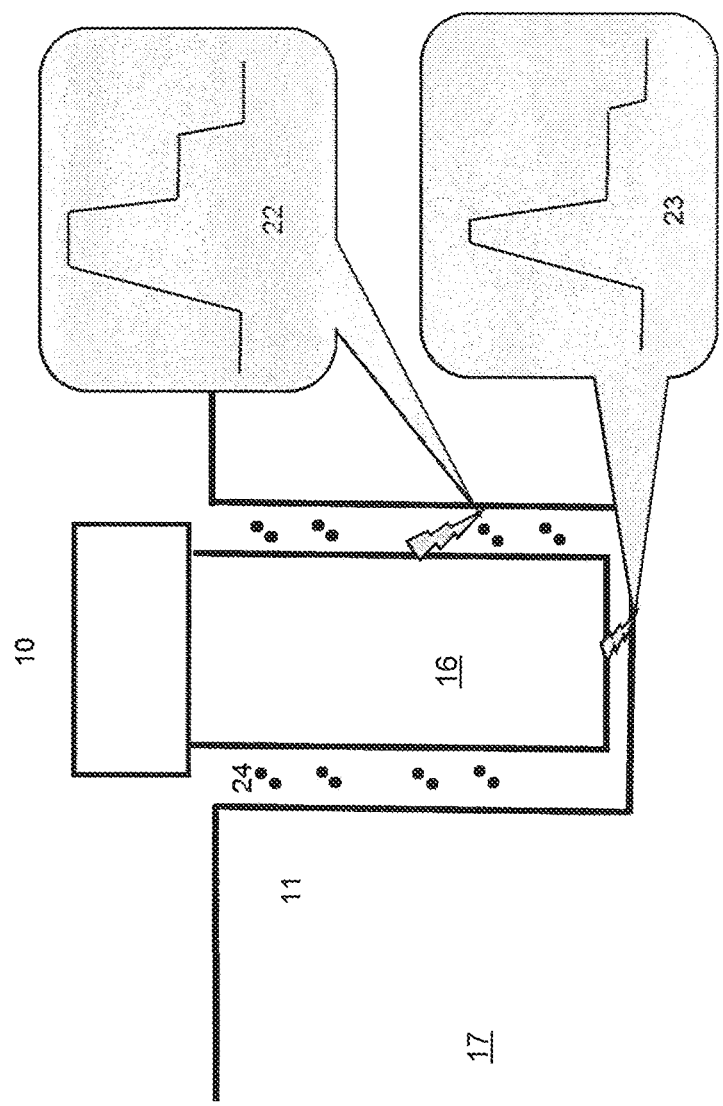
FIG. 2 is a schematic representation of an electrode machining a cavity in a workpiece.

The illustration in the schematic FIG. 2 explains the machining of a deep cavity. The front gap is smaller than the side gap, since the eroded particles are evacuated along the latter, and originate secondary discharges. Also, in the case of rib machining, a thin rib-shaped electrode oscillates because of the process forces induced by side sparks. The typical side spark voltage waveform 22 and front spark voltage waveform 23 are shown in FIG. 2. Apart of the waveform itself, the discharge voltage of the typical side spark 22 is higher than the discharge voltage of the typical front spark 23.

Figure 3:
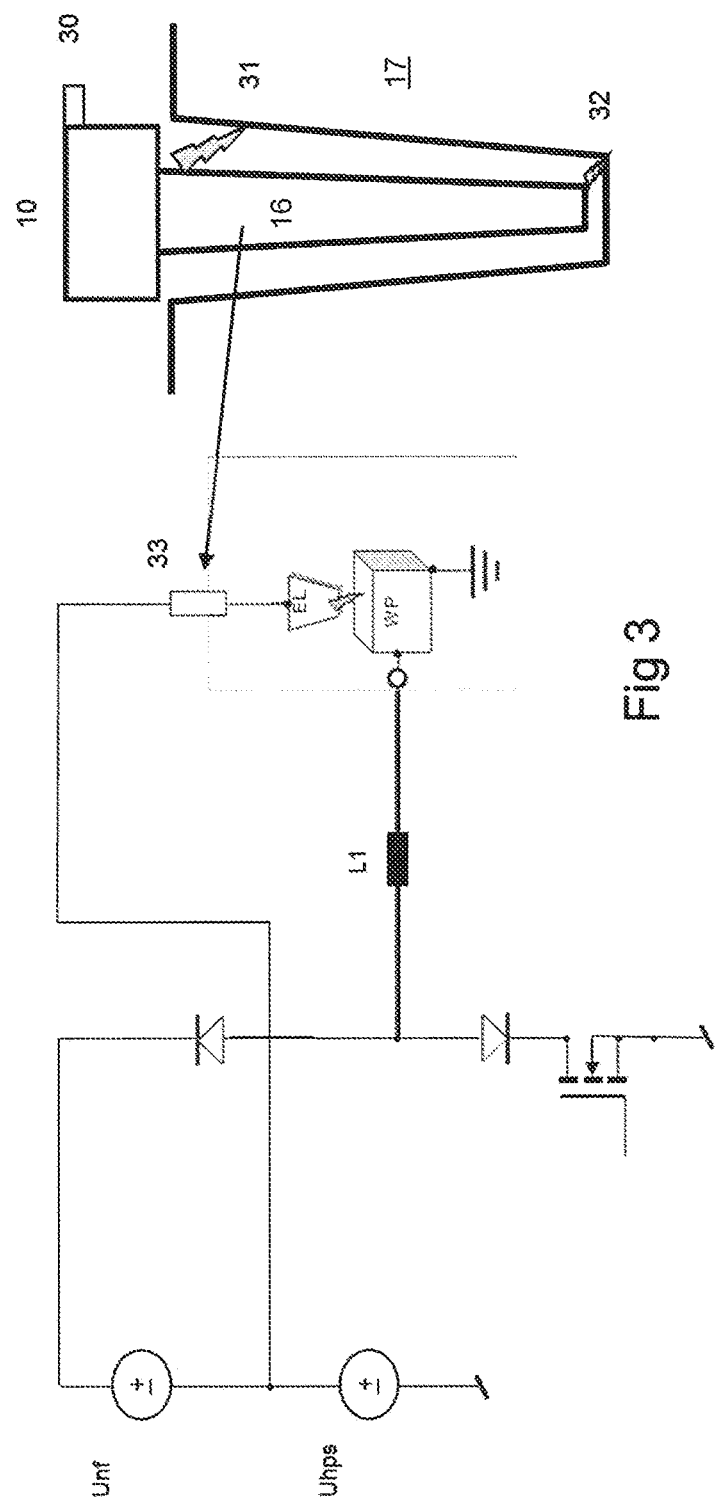
FIG. 3 is an exemplary inventive embodiment of an EDM generator connected to a graphite electrode.

FIG. 3 illustrates a further problem and complication which is solved thanks to the present invention: the measuring error induced by the voltage drop along the electrode. If, as in most cases, a graphite electrode is used, being its specific resistance ρ(graphite)=15 Ω*mm2/m, there may be a considerable voltage drop along the electrode, especially on long and thin electrodes. Since the voltage reference is usually measured on the mandrel (30), said voltage drop has to be added to the discharge voltage. Consequently, a side spark 31 at the top of the electrode will show a higher voltage than a side spark close to the bottom (32) or at the front (see FIG. 3). A typical voltage drop at a discharge current of 60 A could be:

Rib 30 mm long, 10×1 mm2 front area: R=15*0.03/10=0.045Ω

Hence the voltage drop Uel @60 A=2.7 V.

Since the burning voltage lays around 25 V, it is apparent that the systematic error originated by the voltage drop of +/−2.7 V excludes the use of absolute thresholds to distinguish between front and lateral discharges; only relative values should be used.

The FIGS. 4a and 4b illustrate typical current pulses as observed with a generator working by the known switching mode principle, which causes a ripple on the current pulse. In a preferred embodiment said current pulse has a trapezoidal form.

As commonly known, the leading edge of the current pulse is very important, since it is responsible for the electrode wear. There are two ways to impose the pulse leading edge:

The leading edge can be synthesized by modulating the internal set point value of the current control. The programmable current slope 41 shown in FIGS. 4a and 4b is implemented in this first way. The current slope 40, on the other hand, is given by the cable inductance, typically ca 6 μH. Here the current slope 40 is computed according to the formulas:

$$dI+/dt = (Uhps - Ubr)/L \text{ for the leading edge of the pulse}$$

$$dI-/dt = Unf/L \text{ for the trailing edge}$$

where

Unf discharge supply voltage, see FIG. 1

Uhps power supply voltage

Ubr discharge voltage value

FIG. 4a shows the case where Uhps is rather high, typically 80 V, therefore the current slope 40 is steeper than 41. If Uhps is low, e.g. 30 V, gradient dI+/dt becomes very small and current slope 41 is steeper than the current slope 40 (see illustration in FIG. 4b). The gentler slope prevails, shaping the current pulse and determining the electrode wear.

The FIG. 5 illustrates in simplified manner a set of four different current pulses, which can be produced with the same side gap width and the same discharge energy, (which is the integral over the pulse duration of discharge voltage times pulse discharge current) but with different results in terms of material removal rate and electrode wear. The material removal is proportional to the pulse discharge current, whereas the electrode wear is proportional to the current slope, as explained above. For instance, pulse 51 has a higher material removal than pulse 52 but a higher electrode wear than pulse 52 etc.

The machine database contains for every desired side gap width a set of such discharge current pulses that can be programmed in the generator.

In FIG. 6, a discharge voltage set is illustrated in a simplified manner. The lowest discharge voltage 63 corresponds to front or corner sparks. The discharge voltage 62 corresponds on the other hand to the side sparks. And the highest discharge voltage 61 corresponds to the so called resistive discharges, i.e. those discharges occurring through particle bridges in the gap.

Several measurements performed by the applicant show, that the average discharge voltage of a front gap discharge 63 at pulse currents of 50 A is lower by 1.6 V compared with a side gap discharge 62. Resistive discharges have even a much higher discharge voltage; up to 50 V (see reference number 61).

In the following FIGS. 7a, 7b and 7c, further simplified discharge voltage and pulse current forms are shown.

FIG. 7b shows a discharge current pulse generated with conventional means whereas FIG. 7c shows a discharge current pulse generated with the means disclosed by the present invention.

The lines 71 and 72 represent the voltage Uhps of respective power supplies. The line 71 represents a prior art generator with a power supply voltage Uhps of 85 V.

The line 72 represents the generator with a lower power supply voltage Uhps according to the invention, for e.g. a graphite electrode with steel workpiece the required power supply voltage will be of ca. 40 V, typically for other materials the supply voltage will be of 20-40 V, in special case 15-60 V.

As already mentioned, the electrode wear happens during the breakdown phase, which is represented by the shaded area in FIGS. 7a-7c. This is because at first there is only a focused electron beam from the cathode (−, workpiece electrode) towards the anode (+, tool electrode), then, after about 700 ns, ionic current follows in opposite direction, thus flowing from the anode towards the cathode. After this time, the electron beam becomes a cone since the electrons repulse themselves, and recombination and shielding by the ion current takes place, reducing greatly the tool electrode wear. Therefore it is advantageous to keep the product of voltage multiplied by current as small as possible during the beginning of the discharge, in order to minimize the wear.

Based on all these observations, the applicant has discovered that it is advantageous to continuously adapt the power supply voltage Uhps in such a way that it is slightly higher than the actual discharge voltage of a front spark. This adaptation must preferably be made in real time, based on real time comparison of front sparks and side sparks voltage, since, as explained before, the difference between these two types is relatively small.

It is also possible to record the front spark voltage by surface erosion, e.g. at the beginning of the machining on the workpiece surface, or the corner spark voltage by positioning the electrode in the immediate vicinity of a corner of the workpiece, in order to discharge only corner sparks. This is depicted in FIG. 10 where the corner of the electrode lies on an imaginary line 101 at 45 degrees with respect to the workpiece corner.

Figure 9:
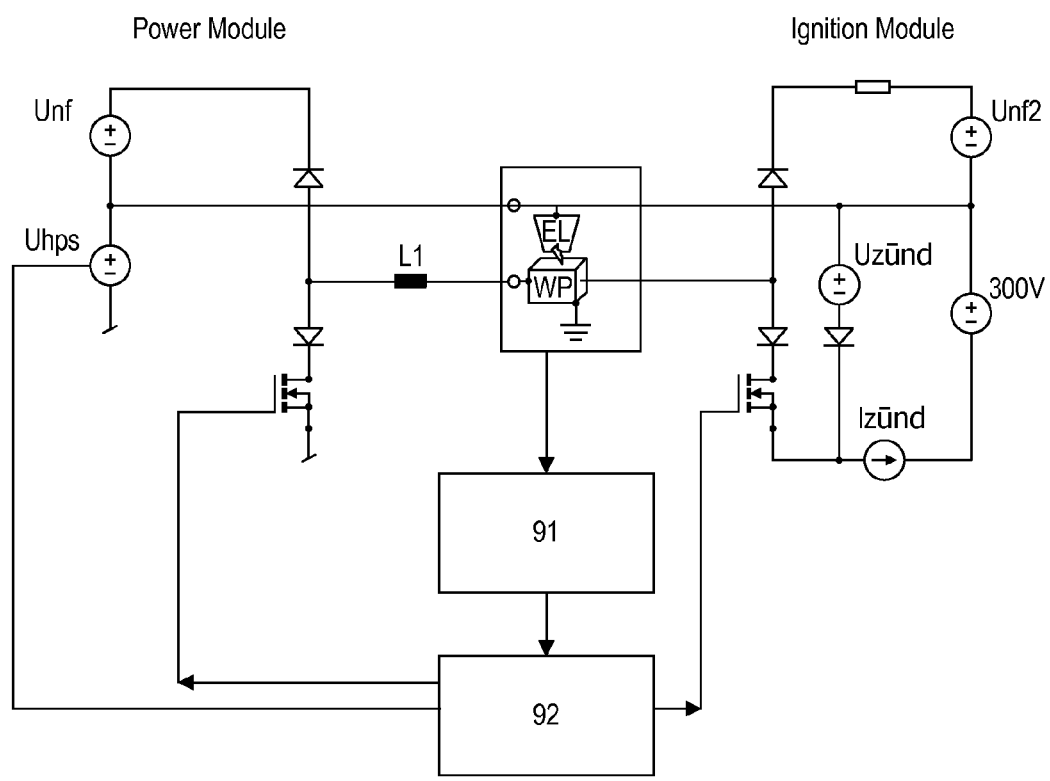
FIG. 9 is a block diagram of a preferred embodiment of the invention.

In some other exemplary embodiments depicted in FIG. 9, the discharge voltage is measured for a number of sparks by an acquisition module 91. Then the discharge voltage of a number of pulses having lowest discharge voltage values are averaged, representing therewith the front discharge voltage respectively the value 63 according to FIG. 6. To this value, a predetermined offset is added; the offset value can be determined by experiment and stored in a database for being use.

The value 63 can also be determined, as mentioned, by measuring the discharge voltage at the beginning of the erosion job, when the tool electrode is at the surface of the workpiece and there are only front discharges.

The value 62 can on the other hand also be determined by measuring the discharge voltage in the eroded cavity after having retracted the tool electrode from its deepest position, generating therewith mostly side sparks of discharge voltage value 62.

The power supply voltage Uhps is then adjusted by the inventive generator controller module 92 to the voltage level 64, as represented by the dotted line in FIG. 6. In a preferred embodiment, said voltage level can be set according to the following formula:

$$Uhps = Ubr,\text{front} + Ucab + Udiode + Us$$

Where:
Ubr, front is the discharge voltage 63
Ucab is the voltage drop on the electrode cables
Udiode is the voltage drop on the power module blocking diode 10
Us is a safety margin By changing the power supply voltage Uhps, the slope 40 or 41 of the current pulse and its energy (see FIG. 5) are also changed. Thus, in some embodiments an energetically equivalent pulse is used. By changing the pulse duration and the current amplitude Ip in order to have the same gap width and pulse energy, the required geometric accuracy of the workpiece is guaranteed, the tool electrode wear is significantly reduced and the discharges will mainly occur in the front gap.

The inventive method using for instance the inventive acquisition module 91 is repeated during the whole electrical discharge machining of the workpiece. The safety margin Us can be identified for instance computing the difference between the lateral and the frontal discharge voltage divided by 2.

In some exemplary embodiments it is advantageous to use pulses producing a very low wear of the tool electrode, if the shape of the electrode must be preserved e.g. in its corners, or to obtain minimal radiuses on the workpiece to machine, or for a tip shaped electrode.

These pulses are characterized by a very low discharge voltage. In this case it is not only advantageously to lower the Uhps according to the invention respectively as disclosed above, but also to shape the pulse leading edge 41 to a very low slope, and to increase the pulse duration and/or lower the current amplitude, to minimize said wear.

Additionally it is advantageous for some applications to cut off these pulses in real time, as soon as this low discharge voltage is detected.

Moreover, in some exemplary embodiments, the invention takes advantage of an additional feature of the side spark, i.e. a longer ignition delay, as represented in FIG. 2 (waveforms 22 and 23). It is advantageous to work in the so called "isofrequency mode", using a current pulse with an increasing current, as depicted in FIG. 8. In this mode the generator issues pulses of the same duration 85. With longer ignition delays 82, the current pulse duration is shorter and vice versa. Another advantage of this inventive method is, that the energy is concentrated or focused on the front area of the cavity and reduced at the walls of the cavity, where it is desired to have a special fine surface quality and low heat affected zone (which are proportional to the energy).

Therefore side pulses 84, if any, will have a reduced energy and pulse amplitude compared with front pulses 83. This method can be used in conjunction with the adaptation of the power supply voltage Uhps, to reinforce its effect.

The invention is a method for the electrical discharge machining of workpieces by electrical discharge pulses generated by a power module of an electrical discharge machine. The discharge voltage Ubr of each electrical discharge pulse, which occurs between the tool electrode and the workpiece, is acquired and stored. This is done for a number N1 of occurring electrical discharge pulses. Out of that amount of N1 stored discharge voltages (see e.g. ref, numbers 22, 23, 31, 32, 61, 62, 63) a front discharge voltage Ubr,front is determined. The determination of Ubr,front can occur in different ways, as already described and as will follow in the next lines. Subsequently, the voltage Uhps (64) produced by the power module of the generator is adjusted according to the invention in function of the determined front discharge voltage Ubr,front. This is done to provoke according to the present invention the generation of front discharges pulses (between the tool electrode and the machined workpiece obviously) rather than undesired side discharges. This is of course also a statistical question.

The inventive method for determining the front discharge voltage Ubr,front is preferably applied during the entire electrical discharge machining of the workpiece or in determinable intervals during the electrical discharge machining of the workpiece.

In a most preferred variant, the method for determining the front discharge voltage Ubr,front is done by averaging an amount N2 of lowest stored discharge voltages out of the amount N1 of stored discharge voltages (calculating the average voltage of the N2 stored values). Subsequently, the voltage Uhps (64) for the electrical discharge pulses produced by the power module of the generator is calculated according to the following formula $$Uhps=Ubr,\text{front}+Ucab+Udiode+Us,$$

where
Ubr,front is the front discharge voltage 63
Ucab is the voltage drop on the electrode cables
Udiode is the voltage drop on the power module blocking diode 10
Us is a safety margin.

In another variant, the method for determining the front discharge voltage Ubr,front is conducted by moving the tool electrode used in the electrical discharge machining process in such a spatial position in respect of the workpiece, that only front discharge pulses can occur between the workpiece and the tool electrode. Subsequently an amount N3 of electrical discharge pulses is generated according to this variant. By averaging the N3 measured discharge voltages of the produced electrical-front-discharge pulses, the front discharge voltage Ubr,front can be determined by measurement for the respective case.

Equivalently, such a measuring method can also be applied for determining the side discharge voltage Ubr,side. This can be done by moving the tool electrode used in the electrical discharge machining process in such a spatial position in respect of the workpiece, that only side discharges can occur between the workpiece and the tool electrode (schematically, reference is made to the reference numbers 22, 31, 32 of the figures). By subsequently generating an amount N4 of electrical-side-discharge pulses and by averaging the measured discharge voltages of the N4 produced electrical-side-discharge pulses, the side discharge voltage Ubr,side is determined by measurement for the respective case. With this measurement method for determining the side discharge voltage Ubr,side, the voltage Uhps of the electrical discharge pulses produced by the power module of the generator can be calculated by using the determined side discharge voltage Ubr,side and applying the following formula: Uhps=Ubr,side−Us; where Us is a definable safety margin.

Equivalently to both foregoing measuring methods, the voltage of corner discharges can be determined in a similar way by moving the tool electrode used in the electrical discharge machining process in such a spatial position in respect of the workpiece that only corner discharges (see reference number 101 in FIG. 10) can occur between the workpiece and the tool electrode. By subsequently generating an amount of N5 electrical discharge pulses and by averaging the voltage values of that N5 measured and stored discharge voltages, the corner discharge voltage Ubr,corner can also be determined by measurement.

With this measurement method for determining the corner discharge voltage Ubr,corner, the voltage Uhps of the electrical discharge pulses produced by the power module of the generator can be calculated by using the measured corner discharge voltage Ubr,corner and the formula $$Uhps=Ubr,\text{corner}+Ucab+Udiode;$$

where
Ucab is the voltage drop on the electrode cables
Udiode is the voltage drop on the power module blocking diode 10

In a further embodiment of the invention, every time the voltage Uhps (64) of the electrical discharge pulses produced by the power module of the generator is calculated and adjusted, additionally an energy-equivalent discharge pulse is chosen, either from a pre-computed database (stored database) or by calculating it.

Preferably, the generator pulses are issued in isofrequency mode and the current shape has a current amplitude increasing with the pulse duration.

In another variant, the slope of the generator pulses is changed in one of the following ways: a) by programming the internal current reference of the generator, and/or by b) adapting the Uhps power supply.

The invention relates however not only to the inventive method itself and its described variants, but also to a device—e.g. control system or machine tool—which works according. Such an inventive apparatus for electrical discharge machining of workpieces by electrical discharge pulses, comprises at least an ignition module for producing the ignition voltage Uign; at least one power module for producing generator pulses at a programmable current amplitude, shape, duration and voltage Uhps, a programmable voltage power supply (12), a gap voltage acquisition module (91), and a generator controller (92) with a control system for the power module of the generator for determining the voltage Uhps (64) of the electrical discharge pulses produced by the power module of the generator in accordance with the inventive method or process as described above.

The above specification refers to the preferred modes of execution for the invention, but more or less similar embodiments are possible. The invention is therefore not limited to the embodiments described herein. These examples are more intended as incitement to the person skilled in the art to implement the inventive concept advantageously.

What is claimed is:

1. A method for the electrical discharge machining of workpieces by electrical discharge pulses generated by an output voltage generated by a power module of an electrical discharge machine, said electrical discharge pulses including front discharge pulses extending from a front of tool electrode and having a front discharge voltage, and side discharge pulses extending from a side of the tool electrode and having a side discharge voltage, said method comprising, a.) acquiring and storing a number of front and side discharge voltages; and
   b.) adjusting the output voltage generated by the power module as a function of an analysis of the discharge pulses in step a.) to provide front discharge pulses while minimizing the occurrence of side discharge pulses; and
   wherein step b.) comprises averaging an amount N2 of the lowest stored discharge voltages out of a total amount N1 of stored discharge voltages and wherein the output voltage (Uhps) generated by the power module of the generator is calculated according to the following formula $$Uhps = Ubr,\text{front} + Ucab + Udiode + Us$$

Where
- Ubr,front is the front voltage
- Ucab is the voltage drop on the electrode cables
- Udiode is the voltage drop on the power module blocking the diode
- Us is a safety margin.

2. The method for electrical discharge machining of workpieces according to claim 1, wherein,
   step a.) occurs during the entire electrical discharge machining of the workpiece or in determinable intervals during the electrical discharge machining of the workpiece.

3. The method for electrical discharge machining of workpieces according to claim 1, wherein,
   step a.) is performed by moving the tool electrode used in the electrical discharge machining process in such a spatial position in respect of the workpiece, that only front discharge pulses can occur between the workpiece and the tool electrode, and wherein step b.) includes generating an amount N3 of electrical discharge pulses and by averaging the N3 measured discharge voltages of the produced electrical discharge pulses to determine therewith the front discharge voltage Ubr,front.

4. The method for electrical discharge machining of workpieces according to claim 1, wherein,
   step a.) comprises moving the tool electrode used in the electrical discharge machining process in such a spatial position in respect of the workpiece, that only side discharges can occur between the workpiece and the tool electrodes, and wherein step b.) includes generating an amount N4 of electrical discharge pulses and by averaging the measured discharge voltages of the N4 produced electrical discharge pulses to determine therewith the side discharge voltage Ubr,side.

5. The method for electrical discharge machining of workpieces according to claim 4, wherein,
the output voltage Uhps of the power module is calculated by the determined side discharge voltage Ubr,side and the formula $$Uhps = Ubr,\text{side} - Us;$$

where
Us is a safety margin.

6. The method for electrical discharge machining of workpieces according to claim 1, wherein every time the output voltage Uhps of the power module is adjusted, additionally an energy-equivalent discharge pulse is chosen, either from a pre-computed database or by calculating it.

7. The method for electrical discharge machining of workpieces according to claim 1, wherein the front discharge pulses are generated in isofrequency mode, and the current shape of the front discharge pulses has a current amplitude increasing with the pulse duration.

8. The method for electrical discharge machining of workpieces according to claim 1, wherein the slope of the front discharge pulses is changed in one of the following ways
   a) by programming an internal current reference of the generator, and/or
   b) by adapting the Uhps power supply.

9. An apparatus for electrical discharge machining of workpieces by electrical discharge pulses, comprising
   at least an ignition module for producing an ignition voltage Uign;
   at least one power module for producing generator pulses at a programmable current amplitude, shape, duration and voltage Uhps,
   a programmable voltage power supply,
   a gap voltage acquisition module,
   a generator controller with
      a control system for the power module of the generator for determining the voltage Uhps of the electrical discharge pulses produced by the power module of the generator in accordance with claim 1.

* * * * *